Patented Oct. 17, 1922.

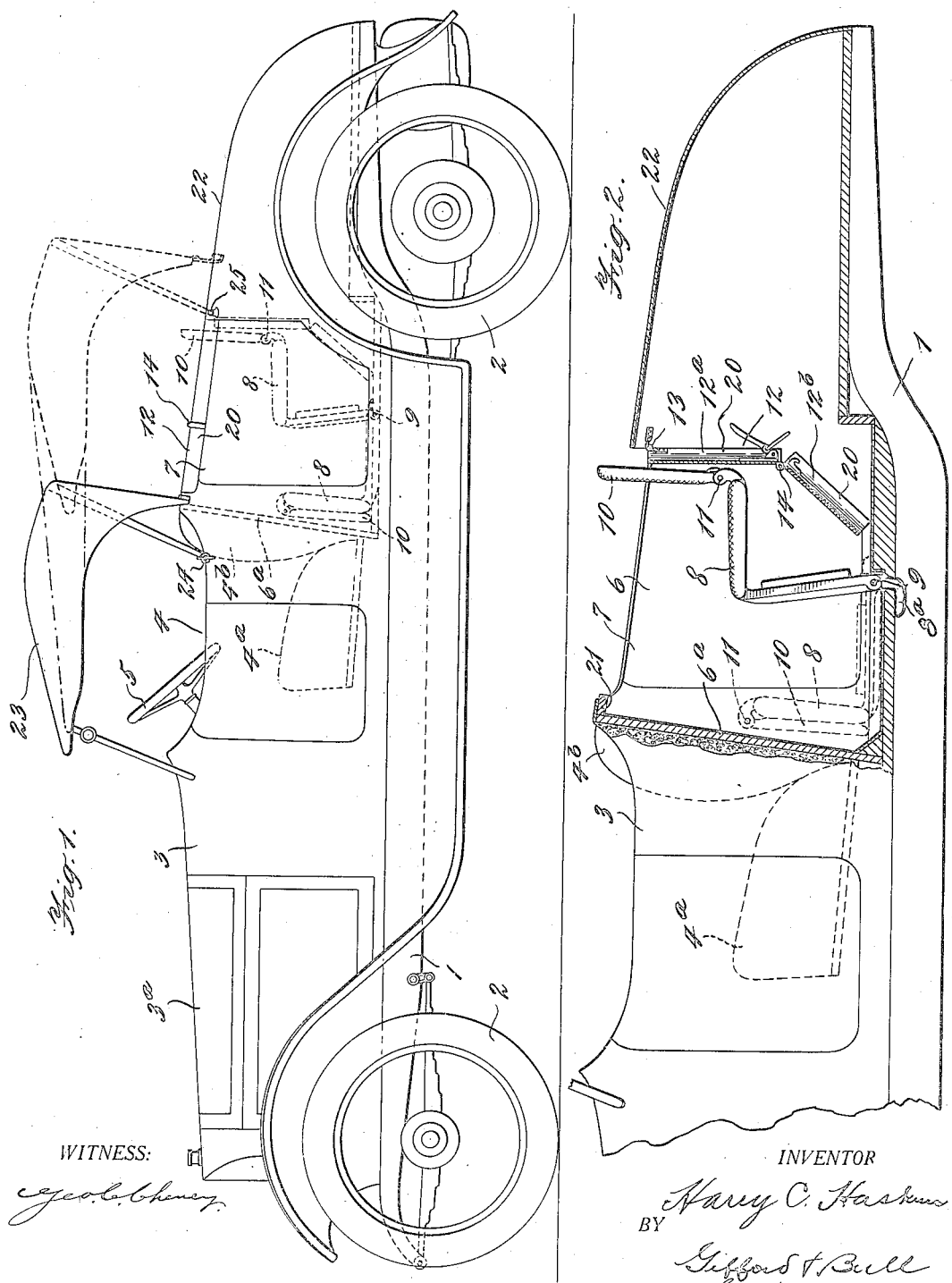

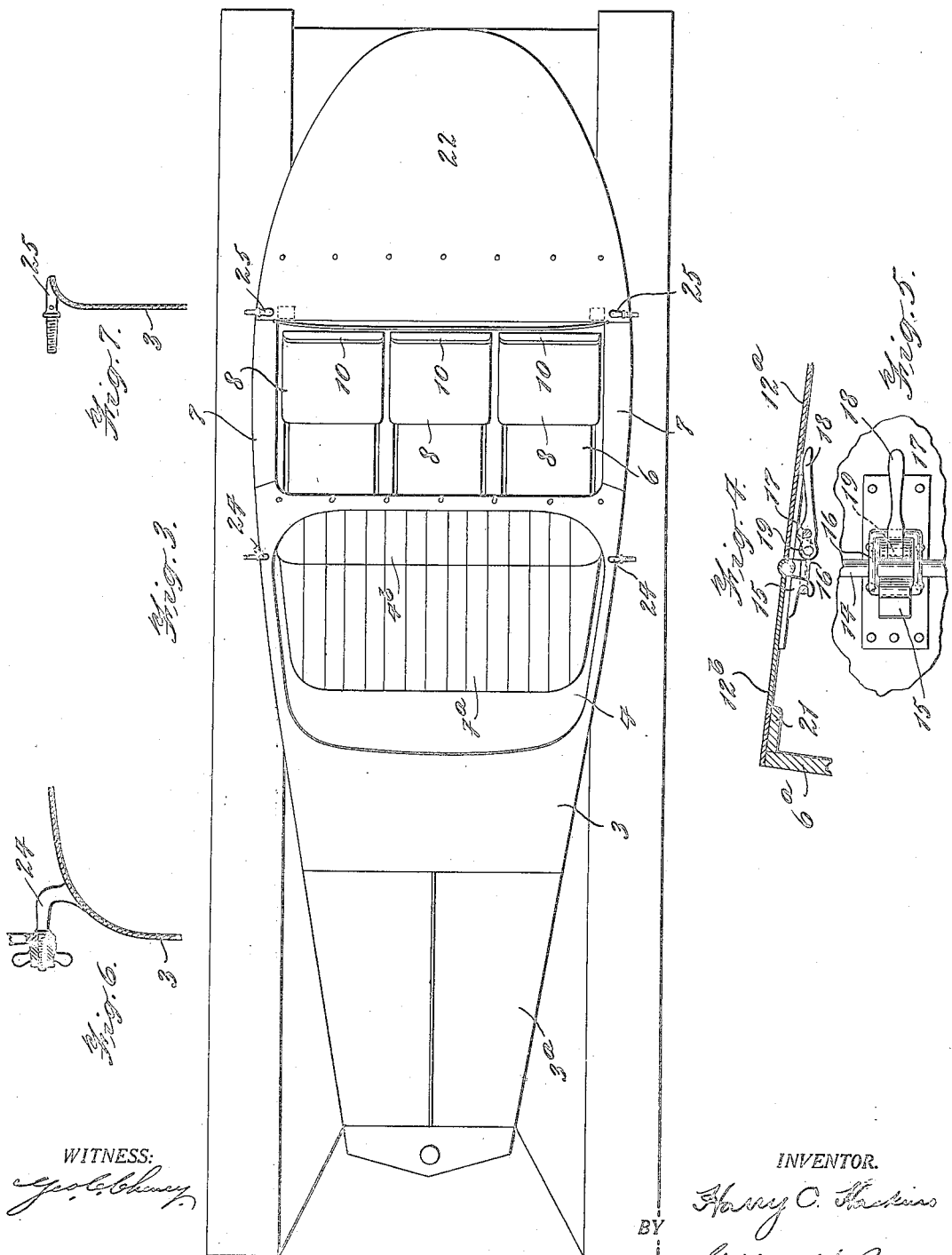

1,432,244

UNITED STATES PATENT OFFICE.

HARRY C. HASKINS, OF NEW YORK, N. Y.

CONVERTIBLE VEHICLE BODY.

Application filed May 6, 1919. Serial No. 295,040.

*To all whom it may concern:*

Be it known that I, HARRY C. HASKINS, a citizen of the United States, residing at New York city, borough of Manhattan, county of New York and State of New York, have invented certain new and useful Improvements in Convertible Vehicle Bodies, of which the following is a specification.

My invention relates to new and useful improvements in convertible bodies for vehicles, and more particularly relates to an improvement by which the body of a vehicle, for example, a motor vehicle, is provided in addition to the usual compartment for the driver, with a second compartment in which is disposed a folding seat, together with a deck cover whereby the said second compartment of the body may be opened and closed, and said body converted at will into either a single-seated roadster body, or into a touring car having front and rear seat compartments.

The invention consists in the improvements to be more fully described hereinafter, and the novelty of which will be particularly pointed out and distinctly claimed.

I have fully and clearly illustrated my invention in the accompanying drawings to be taken as a part of this specification, and wherein—

Figure 1 is a side view of a vehicle embodying my invention;

Fig. 2 is a longitudinal vertical section showing parts of the vehicle in elevation and with the top removed;

Fig. 3 is a plan view of Fig. 2;

Figs. 4 and 5 are detail views of the member for clamping together the sections of the deck cover;

Fig. 6 is a detail view of the means by which the top is attached to the front of the car; and Fig. 7 is a similar view showing the means for attaching the top over the rear compartment of the car.

Like reference characters indicate like parts in the various views.

Referring now to the drawings, 1 is a portion of the chassis, of any well-known form or type, which is supported on wheels 2, and which in turn supports the body 3 of the car, the hood being shown at $3^a$. The body is provided with the usual compartment 4 for the driver, in which is located the steering wheel 5, and the seat $4^a$, and the back of the seat $4^b$. In accordance with my invention, the body of the car is also provided with a rear compartment 6, divided from the compartment 4 by the partition $6^a$, the side walls of the rear compartment being provided with doorways open and closed by hinged doors 7 of any well-known form. A jump-seat 8 is located in this rear compartment, and is pivoted, as at 9, to the bottom wall of the compartment and is formed with a sectional member 10 pivoted at 11, which in the elevated position of the seat shown in Fig. 2 forms a back for the occupants of the rear compartment. The seat 8 is preferably provided with a lug $8^a$ which extends beyond the pivot 9 through the floor, which lug serves as a stop to limit the movement of the seat when raised and to retain the same in the raised position, as indicated in Figure 2. When the folding jump-seat is not to be used, the section 10 is folded against the seat, and the seat is then swung about the pivot 9 and folded against the bottom of the rear compartment, as indicated in dotted lines in Figs. 1 and 2. It will, of course, be understood that the seat 8 may be formed as a single seat extending across the entire compartment, or there may be one, two or three, or, in fact, any number of jump-seats arranged along side of each other, three such seats being shown in Fig 3.

A cover 12 is provided for the rear compartment 6, which cover is hinged to the deck transversely of the latter, as at 13, and is formed in sections $12^a$, $12^b$, which are illustrated, by way of example, as hinged together as at 14 on a line extending transversely of the said cover and the vehicle body. When in the elevated position the two parts are secured rigidly together by a clamping member comprising a hook 15 secured to the section $12^b$, which is engaged by a clasp 16 in the form of an eye, preferably rectangular in form, as shown, one end bar of which is pivoted, as at 17, to an operating handle 18. The operating handle 18 is pivoted at 19 on a bracket secured to the section $12^a$.

In order to release the two sections, the operating handle 18 is moved downwardly, as viewed in Fig. 4, about its pivot 19, thereby moving the pivotal point 17, and hence the clasp 16 itself, to the left, and freeing the clasp from the hook 15. To clamp the two sections $12^a$ and $12^b$ together, the clasp 16 is placed in engagement with the hook 15, and the handle 18 is then moved to the position shown in Fig. 4, in which the pivot 17 is above the pivot 19 of the handle, thus locking the parts in position. Any other suitable device may be employed for securing the panel parts 12ᵃ, 12ᵇ together. The cover 12 is preferably provided with side flanges 20, which in the closed position shown in Fig. 1, extend over and engage the doors 7, thereby forming a water-tight joint for the compartment, the front end of the cover resting on a cross-member 21, as best shown in Fig. 4. The top of the door is provided with an inwardly extending flange (see Figs. 2 and 3) which comes beneath the deck when the latter is in closed position, the door bodies being sufficiently spaced to accommodate, when in their closed positions, the deck when the latter is swung downwardly to the position shown in Fig. 2. The doors, therefore, operate independently of the deck whether the latter is up or down; the deck, however, cannot be operated in either direction unless the doors are open. The panel 12, when in the closed position shown in Fig. 1, is arranged to form a continuation of the deck 22, and may be curved upwardly to any degree desired for this purpose.

The top 23 for the car, when the vehicle is to be used as a single-seated roadster, may be placed above the front compartment 4 by attachment to suitable brackets 24 (see Fig. 6), and when the car is to be used as a touring car the same may be disposed, if desired, above the rear compartment 6 by attachment to suitable brackets 25 (see Fig. 7), an extension over the front compartment being provided, if desired.

When the vehicle is to be used as a single-seated roadster, the doors 7 are opened and the seat 8 is folded into the position indicated in dotted lines in Fig. 2 and the cover 12 is then raised to a position above the compartment. The doors 4 may then be closed beneath the deck, and when closed, the vehicle presents the appearance of an ordinary single-seated roadster. When the vehicle is so used, the compartment 6 constitutes a convenient storage space for trunks, luggage, or other articles. In order to convert the vehicle to a two-seated touring car, the doors are opened, the two sections 12ᵃ and 12ᵇ are unclamped so as to swing on the hinges 14, and the cover dropped into the depending position in the rear portion of the compartment, shown in full lines in Fig. 2. The seat 8 is then elevated to a position in front of the depending cover and the section 10 raised to the position shown in Fig. 2 to form a back for the seat. When the vehicle is ready for use as an ordinary touring car, the side doors 7 afford easy access to the rear compartment. It will, of course, be understood that suitable lugs or other stops will be provided which the seat engages in its raised position.

While I have herein shown and described one modification of my invention, I do not desire to be limited to the exact arrangement shown and described, but seek to cover in the appended claims all those modifications which come within the true spirit and scope of my invention.

What I claim and desire to secure by Letters Patent of the United States is:—

1. A vehicle body comprising a front compartment and a rear compartment separated by a transverse partition, a permanent deck in rear of the rear compartment, and a cover hinged to the front portion of the permanent deck and adapted to extend from the deck to said partition, and thereby close said rear compartment, said cover being hinged to drop within the said rear compartment at the rear of the latter.

2. A vehicle body comprising a compartment, a hinged seat disposed within said compartment and arranged to assume an elevated position to serve as a seat or to be folded against the bottom of the compartment, and a hinged deck panel arranged either to form a cover for said compartment or to be disposed within said compartment.

3. A vehicle body comprising a compartment, side doors communicating with said compartment, a hinged seat formed with a hinged back and arranged to assume an elevated position to serve as a seat or to be folded against the bottom of the compartment, and a hinged cover arranged to assume two different positions, in one position to form a cover for said compartment and in the other position to depend within said compartment.

4. A vehicle body comprising a compartment, side doors communicating with said compartment, a hinged seat formed with a hinged back and arranged to assume an elevated position to serve as a seat or to be folded against the bottom of the compartment, and a hinged cover arranged to engage said doors and assume two different positions, in one position to form a cover for said compartment and in the other position to be disposed within said compartment.

5. A vehicle body comprising a compartment, a hinged seat formed with a hinged back arranged to swing forwardly and to be folded against the bottom of the compartment and to be elevated to serve as a seat, and a hinged cover for said compartment arranged to swing downwardly and backwardly to the rear of the seat in its elevated position.

6. A vehicle body comprising a front compartment and a rear compartment separated by a transverse partition, a permanent deck in rear of the rear compartment, and a cover hinged to the front portion of the permanent deck and adapted to extend from the deck to said partition and thereby close said rear compartment, said cover being hinged to drop within the said rear compartment at the rear of the latter, and a folding seat adapted to take position in front of said cover when in its dropped position.

7. A vehicle body comprising a front compartment and a rear compartment separated by a transverse partition, a permanent deck in rear of the rear compartment, and a cover hinged to the front portion of the permanent deck and adapted to extend from the deck to said partition and thereby close said rear compartment, said cover being composed of hingedly connected panels and being hinged to drop within the said rear compartment at the rear of the latter, and a folding seat adapted to take position in front of said cover when in its dropped position.

8. A vehicle body comprising a compartment, side doors for said compartment provided at the top with inwardly extending flanges, and a hinged deck panel constructed and arranged to form a cover for said compartment and be disposed above said door flanges, or to be disposed within said compartment between the door bodies when the latter are in their closed positions.

In testimony whereof I have hereunto signed my name in the presence of two subscribing witnesses.

HARRY C. HASKINS.

Witness:
DANN L. WOOD.